United States Patent
Mosnier et al.

(10) Patent No.: US 12,240,720 B2
(45) Date of Patent: Mar. 4, 2025

(54) SEPARATION DEVICE FOR REMOVING A PROFILED ELEMENT FROM A CONVEYING SURFACE, AND EXTRUSION MACHINE PROVIDED WITH SUCH A SEPARATION DEVICE

(71) Applicant: COMPAGNIE GENERALE DES ETABLISSEMENTS MICHELIN, Clermont-Ferrand (FR)

(72) Inventors: Thomas Mosnier, Clermont-Ferrand (FR); Christophe Ougier, Clermont-Ferrand (FR); Miguel Torres-Castellano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 328 days.

(21) Appl. No.: 17/788,875

(22) PCT Filed: Dec. 16, 2020

(86) PCT No.: PCT/FR2020/052478
§ 371 (c)(1),
(2) Date: Jun. 24, 2022

(87) PCT Pub. No.: WO2021/130438
PCT Pub. Date: Jul. 1, 2021

(65) Prior Publication Data
US 2023/0036508 A1    Feb. 2, 2023

(30) Foreign Application Priority Data
Dec. 24, 2019   (FR) ..................... 1915528

(51) Int. Cl.
*B65H 29/56* (2006.01)
*B29C 48/07* (2019.01)
(Continued)

(52) U.S. Cl.
CPC ............. *B65H 29/56* (2013.01); *B29C 48/07* (2019.02); *B29C 48/35* (2019.02);
(Continued)

(58) Field of Classification Search
CPC .... B65H 2404/1541; B65H 2404/7431; B65H 29/56
See application file for complete search history.

(56) References Cited

U.S. PATENT DOCUMENTS 3,820,776 A * 6/1974 Fujimoto ............... B65H 29/56
271/308
3,926,429 A  12/1975  Satomi et al.
(Continued)

FOREIGN PATENT DOCUMENTS

| GB | 866358 | 4/1961 |
|---|---|---|
| JP | 62-21513 A | 1/1987 |
| JP | 2006-123219 A | 5/2006 |

OTHER PUBLICATIONS

International Search Report dated Apr. 20, 2021, in corresponding PCT/FR2020/052478 (4 pages).

*Primary Examiner* — Howard J Sanders
(74) *Attorney, Agent, or Firm* — VENABLE LLP

(57) ABSTRACT

A separation device (1) intended to separate a profiled element (2) from a conveying surface (3) which conveys the profiled element (2) in a longitudinal direction (L0) comprises a detachment roller (10) which is mounted so as to be able to rotate on a support (11) about a detachment axis (X10), and which is intended to be interposed, in an engagement configuration (C1), between the profiled element (2)
(Continued)

and the conveying surface (3) to cause the profiled element (2) to become detached from the conveying surface (3).

14 Claims, 11 Drawing Sheets

(51) Int. Cl.
*B29C 48/35* (2019.01)
*B29D 30/00* (2006.01)

(52) U.S. Cl.
CPC ............... *B29D 2030/0038* (2013.01); *B65H 2301/5144* (2013.01); *B65H 2404/1361* (2013.01); *B65H 2404/1541* (2013.01); *B65H 2404/7431* (2013.01); *B65H 2801/93* (2013.01)

(56) References Cited

U.S. PATENT DOCUMENTS

| | | | |
|---|---|---|---|
| 4,026,541 A * | 5/1977 | Brooke | G03G 15/6532 |
| | | | 271/309 |
| 4,443,101 A | 4/1984 | Sakurai et al. | |
| 9,028,241 B2 * | 5/2015 | Leblanc | B29C 43/24 |
| | | | 425/335 |
| 2013/0334729 A1 | 12/2013 | Denavit et al. | |
| 2014/0035188 A1 * | 2/2014 | Leblanc | B29C 43/24 |
| | | | 425/115 |

* cited by examiner

SEPARATION DEVICE FOR REMOVING A PROFILED ELEMENT FROM A CONVEYING SURFACE, AND EXTRUSION MACHINE PROVIDED WITH SUCH A SEPARATION DEVICE

BACKGROUND

The present invention relates to the general field of devices for removing an elongate object, and more particularly a profiled element, from a conveying surface, for example from a belt conveyor, which conveys said object.

The invention relates more particularly to separation devices intended to detach the front edge of a profiled element which rests on a conveying surface, so as to transfer said profiled element from said conveying surface, forming an upstream feed surface, to another downstream receiving surface, which is, for example, formed by another conveying surface.

It is known in particular to make use of separation devices using a gripper which seizes the front edge of the profiled element on the upstream conveying surface in order to detach said profiled element from said surface and place it on the downstream receiving surface.

Under certain conditions, and in particular when the profiled element has a large degree of malleability and/or strong adherence to the upstream conveying surface, as is the case for example for non-vulcanized rubber-based profiled elements, such as the profiled elements intended for the manufacture of pneumatic tyres, such gripper-type devices can sometimes deform or damage the profiled element, or even damage the conveying surface, for example by scratching it.

There can also occur clogging (or "jamming") caused by an accumulation of the material making up the profiled element between the gripper and one or other of the upstream and downstream conveying surfaces. Such a jamming situation requires stopping the production to clean the installation.

The objects assigned to the invention are therefore aimed at overcoming the aforementioned disadvantages and proposing a novel separation device that makes it possible to remove a profiled element from a conveying surface in a reproducible and reliable manner.

SUMMARY

The objects assigned to the invention are achieved by means of a separation device intended to separate a profiled element from a conveying surface which conveys said profiled element in a longitudinal direction so as to forward the profiled element with an advancing movement in the direction of which said profiled element displays a free end, termed "front edge", said device being characterized in that it comprises a detachment roller which is mounted so as to be able to rotate on a support about an axis, termed "detachment axis", and which is intended to be interposed between the profiled element and the conveying surface in order to cause the profiled element to become detached from said conveying surface, said support and the detachment roller being arranged to be able to adopt a configuration, termed "engagement configuration", in which the detachment axis is oriented transversely, preferably perpendicularly, to the longitudinal direction and parallel to the conveying surface, and in which the detachment axis is situated at a distance from the conveying surface which is such that, on the one hand, a gap remains between said detachment roller and the conveying surface, that, on the other hand, the detachment roller forms a stop which opposes the progression of the front edge of the profiled element on the conveying surface and prevents said front edge from crossing the gap, and that, finally, there can be generated a rotation of the detachment roller about the detachment axis, termed "detachment rotation", that constrains the front edge of the profiled element to become detached from the conveying surface so that the profiled element can continue its advancing movement by bypassing and crossing the detachment roller on the opposite side from the gap, while following said detachment rotation.

Advantageously, through a judicious choice of the distance from the detachment axis to the conveying surface, the detachment roller according to the invention is placed sufficiently close to the conveying surface to block the path of the profiled element, and thus to intercept the front edge of the profiled element when said front edge of the profiled element comes to face said detachment roller, with the result that said profiled element is constrained, in order to continue its progression, to cross said detachment roller by bypassing said detachment roller, thus forcing said profiled element to be raised and to move away from the conveying surface.

At the same time, the detachment roller remains sufficiently distant from the conveying surface, by virtue of the gap, in order not to touch the conveying surface, and thus be free to rotate in the direction of the detachment rotation without interfering with said conveying surface, thus allowing the detachment roller to accompany the detachment and the progression of the profiled element.

Finally, the detachment roller according to the invention can therefore advantageously operate by peeling, substantially in the manner of a wedge, here a rotating wedge, which penetrates between the profiled element and the conveying surface, and which thus allows the face of the profiled element that is initially in contact with the conveying surface to leave the conveying surface and to continue its progression on one side of the detachment roller, by rolling on said detachment roller, here on the portion of the detachment roller that is diametrically opposite to the gap, whereas the conveying surface, freed from the profiled element, continues its progression on the other side of the roller, on the gap side, then beyond said gap.

By virtue of the invention, the profiled element can therefore be removed gently, by peeling, from the conveying surface, and be deviated from said conveying surface, in a progressive manner, and in particular by following a guided path whose curvature is sufficiently large so as not to be damaging to the profiled element, so as to be forwarded up to a receiving surface, such as a conveyor belt, arranged downstream of the separating device.

Advantageously, the use of a detachment roller according to the invention avoids jamming, insofar as said detachment roller prevents the profiled element from engaging in the gap, at the risk of being rolled and blocked therein, and similarly prevents the front edge of the profiled element from remaining blocked in abutment against the detachment roller, since the detachment rotation directs said front edge of the profiled element towards the clear space that is formed by the portion of the detachment roller that is situated on the opposite side from the gap and from the conveying surface with respect to the detachment axis, thus passing the profiled element over the detachment roller.

Advantageously, the profiled element can be taken hold of by the detachment roller whatever the effective thickness of the front edge of the profiled element, provided that the engagement configuration, and in particular the dimensioning of the detachment roller and of the gap, have been determined accordingly.

It will be noted in particular that, in a particularly advantageous manner, an engagement configuration capable of detaching a profiled element of predetermined nominal thickness will be able to detach a profiled element having a greater thickness, and that, in particular, the separation device according to the invention will without difficulty accommodate any excess thickness of the bead or fold type that would affect the front edge of the profiled element.

BRIEF DESCRIPTION OF THE FIGURES

Further aims, features and advantages of the invention will become apparent in more detail from reading the following description, as well as with reference to the accompanying drawings, which are provided solely for illustrative and non-limiting purposes, in which.

DETAILED DESCRIPTION

The present invention relates to a separation device 1 intended to separate a profiled element 2 from a conveying surface 3 which conveys said profile element 2 in a longitudinal direction L0.

Said longitudinal direction L0 corresponds in practice to the mid-line along which said profiled element 2 extends in the direction of its length.

The profiled element 2 is forwarded along said longitudinal direction L0 with an advancing movement FM2.

The free end of the profiled element, which is present at the head of said profiled element 2 in the direction of the advancing movement FM2, is termed "front edge" 2F of said profiled element 2.

Preferably, said profiled element 2 is made of a non-vulcanized rubber-based material.

Said profiled element 2 is preferably intended to be involved in the manufacture of a tyre for a vehicle, more particularly a pneumatic tyre.

Said profiled element 2 is, in a particularly preferable manner, intended to form the tread of such a tyre.

Preferably, the profiled element 2 is obtained by extrusion, in the form of a continuous strip emanating from, and shaped by, a die 4, which generates said profiled element in length in the longitudinal direction L0.

Figure 1:
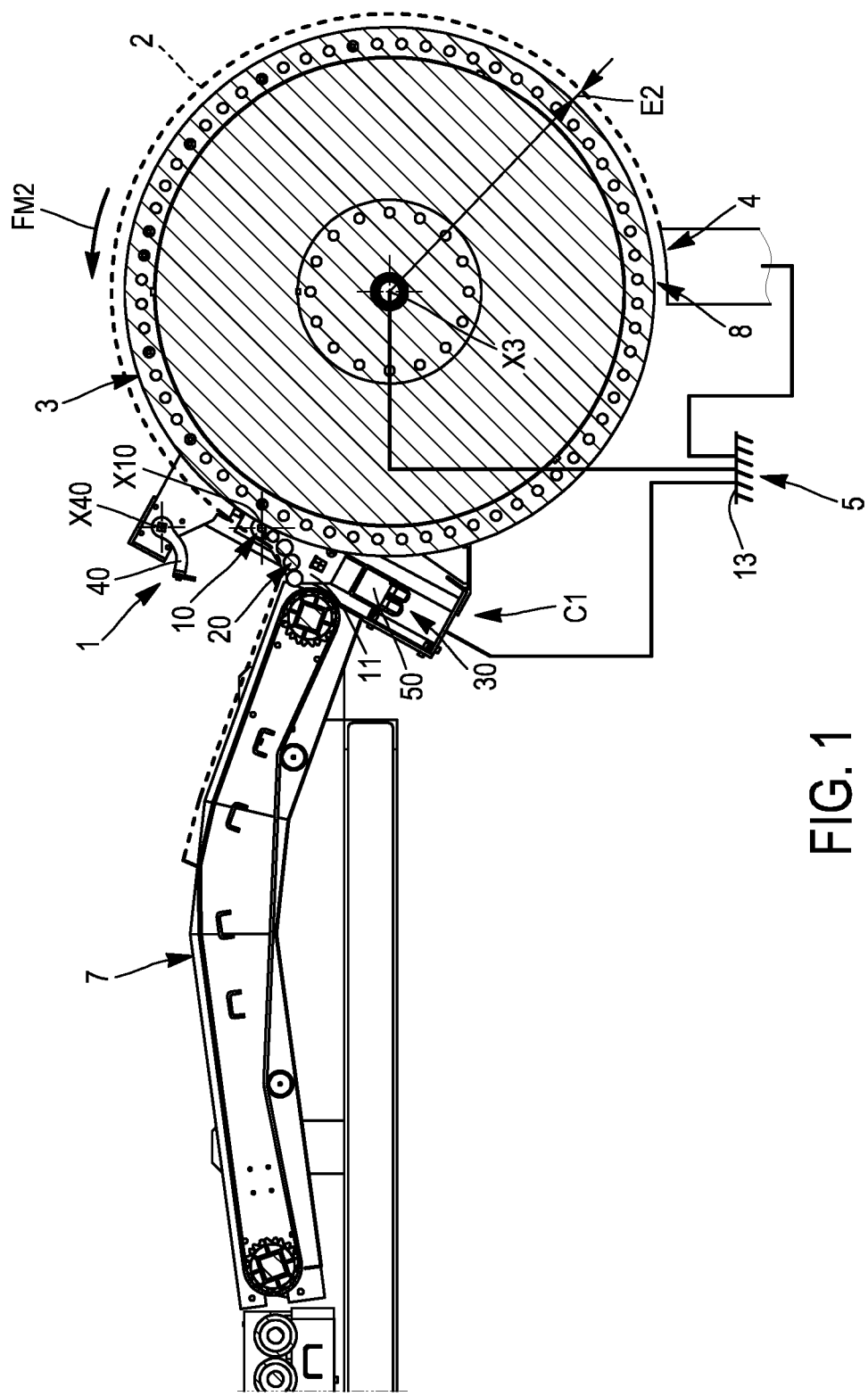
FIG. 1 illustrates, in a sectional side view, an extrusion installation comprising a separation device according to the invention for removing an extruded profile from a conveying surface which is formed by a main roller.
Figure 2:
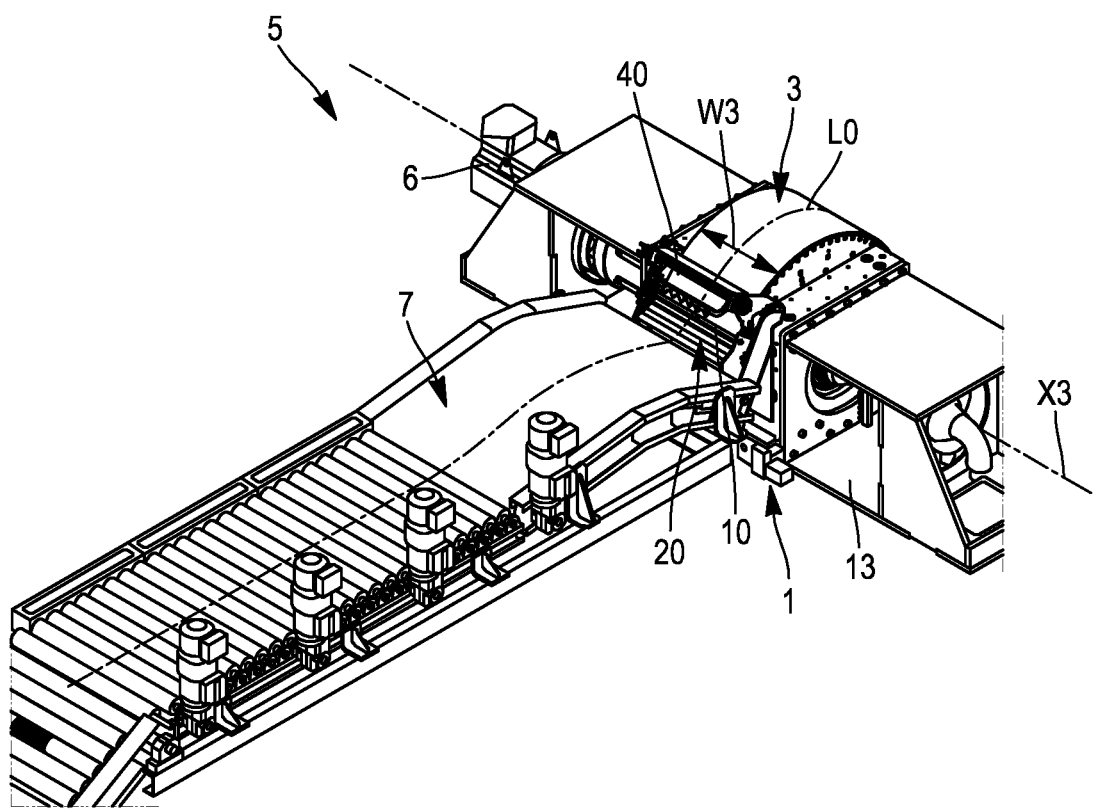
FIG. 2 is a perspective view of the installation of FIG. 1.

In this respect, the invention also relates to an extrusion installation 5 as such, said extrusion installation 5 comprising, as is particularly visible in FIGS. 1 and 2, a die 4 which makes it possible to continuously produce a profiled element 2 by extrusion, a conveying surface 3 which receives the profiled element 2 downstream of said die 4 and which forwards said profiled element 2 to a predetermined distance from the die 4, said installation 5 further comprising a separation device 1 according to invention, which separation device 1 is arranged to remove the profiled element 2 from said conveying surface 3 when said profiled element 2 reaches the predetermined distance.

Preferably, the conveying surface 3 is formed by a roller 3, termed "main roller" 3. Said main roller 3 has a shape of revolution, preferably a cylindrical shape with a circular base, about a main axis X3.

For the sake of convenience for the description and the numbering, the conveying surface 3 and the main roller 3 can be equated with one another in what follows.

The main roller 3 is mounted in rotation R3 about said main axis X3.

The main roller 3, and more generally the conveying surface 3, is preferably driven in rotation by a motor 6, preferably an electric motor, controlled by a control unit, such as an electronic control unit.

Preferably, the main axis X3 is horizontal.

By way of illustration, the main roller 3 may preferably have a diameter of between 15 cm and 300 cm.

The predetermined distance that the profiled element 2 will cover in contact with said conveying surface 3, from the die 4 to the separation device 1, will preferably be chosen to be sufficiently long to ensure that the profiled element 2 is securely maintained on said conveying surface 3, that said profiled element 2 is efficiently driven by the conveying surface 3, and that the profiled element 2 is well stabilized dimensionally by cooling on said conveying surface 3.

By way of illustration, and in particular when the main roller 3 has a large diameter, for example of between 90 cm and 300 cm, this predetermined distance may be equal to or greater than 40 cm, or greater than 50 cm, or even greater than 70 cm, and for example between 50 cm and 500 cm.

When the conveying surface 3 is formed by a main roller 3, said predetermined distance between the die 4 and the separation device 1 preferably corresponds to an angular sector of between 20 degrees and 270 degrees, and for example between 180 degrees (that is to say half a revolution) and 270 degrees (that is to say three-quarters of a revolution) in azimuth about the main axis X3, as is particularly visible in FIG. 1.

Preferably, the profiled element 2 adheres to the conveying surface 3, for example under the effect of natural tack of the material making up the profiled element, as is the case with a material based on raw rubber.

In a variant, and in particular according to the nature of the profiled element 2, this adhesion could be ensured under the effect of a retaining system associated with the conveying surface 3, such as a suction system (of the suction cup type) or a magnet system (if the profiled element is sensitive to magnetization).

In a manner known per se, the die 4 is preferably supplied with one or more materials, here more particularly materials based on raw rubber, which are obtained from one or more extruders, such as screw extruders comprising a barrel in which a screw is mounted in rotation about its longitudinal axis to knead, heat and pressurize the material in question.

The installation 5 moreover preferably comprises a receiving surface 7, which is separate and distant from the conveying surface 3, and positioned downstream of the separation device 1 in the direction of progression of the profiled element 2, that is to say in the direction of the advancing movement FM2, so as to be able to accept the profiled element 2 at the outlet of the separation device 1, and, where appropriate, so as to be able to forward said profiled element 2 to another station, such as a cutting station which will make it possible to cut said profiled element 2 into profiled element sections of predetermined length.

Preferably, said receiving surface 7 can be formed by a belt conveyor and/or roller conveyor, as is visible in FIGS. 1 and 2.

Moreover, the conveying surface 3 is particularly preferably formed by a main roller 3 which defines, with the die 4, a gap 8 which determines the thickness E2 of the profiled element 2.

In other words, the installation 5 preferably forms a roller extruder, which particularly allows good control of the geometry and the regularity of the profiled element 2.

The thickness E2 of the profiled element is here considered in the direction normal to the conveying surface 3 at the point in question, and therefore in particular in a radial manner with respect to the main axis X3.

By way of illustration, the thickness E2 of the profiled element, in this case the nominal thickness E2 of said profiled element 2 that it is desired to give said profiled element 2, and which must therefore correspond to the thickness according to which the profiled element 2 is generated when the installation 5 is functioning in steady state operation, may be between 2 mm and 100 mm, and for example between 5 mm and 25 mm, for example equal to 10 mm or 12 mm.

According to the invention, the separation device 1 comprises a detachment roller 10 which is intended to be interposed between the profiled element 2 and the conveying surface 3 in order to cause the profiled element 2 to become detached from said conveying surface 3.

To this end, said detachment roller 10 is mounted so as to be able to rotate on a support 11 about an axis, termed "detachment axis" X10.

The detachment roller 10 has a shape of revolution, preferably a cylindrical shape with a circular base, centred on the detachment axis X10.

The support 11 and the detachment roller 10 are arranged to be able to adopt a configuration, termed "engagement configuration" C1, in which the detachment axis X10 is oriented transversely, preferably perpendicularly, to the longitudinal direction L0 and parallel to the conveying surface 3.

Thus, the detachment roller 10 is advantageously placed, in the manner of a barrier, across the path followed by the profiled element 2 when said profiled element rests on the conveying surface 3 and is driven in the advancing movement FM2, which advancing movement FM2 is preferably generated by the conveying surface 3 and which therefore preferably coincides with the rotation R3 of the main roller 3.

Figure 3:
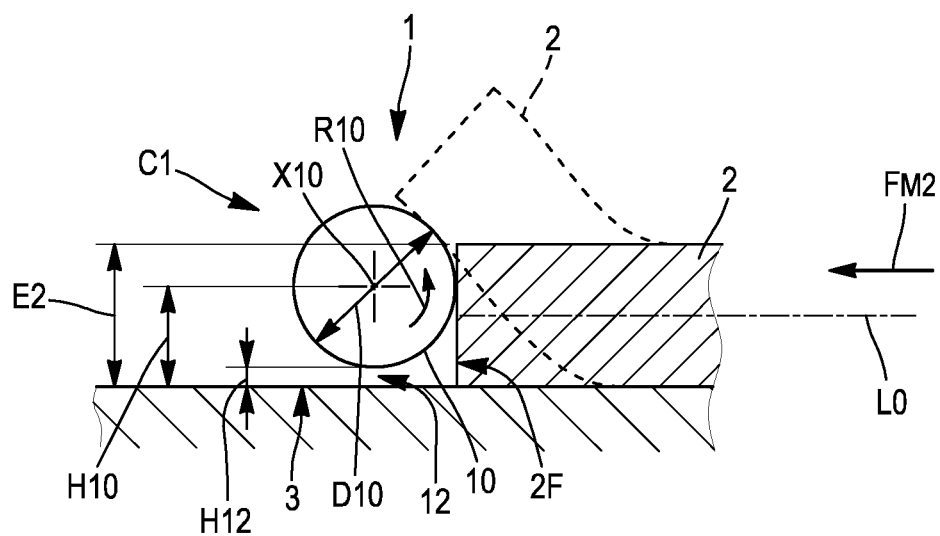
FIG. 3 illustrates, in a schematic side view, the principle of the peeling carried out by a detachment roller according to the invention.
Figure 6:
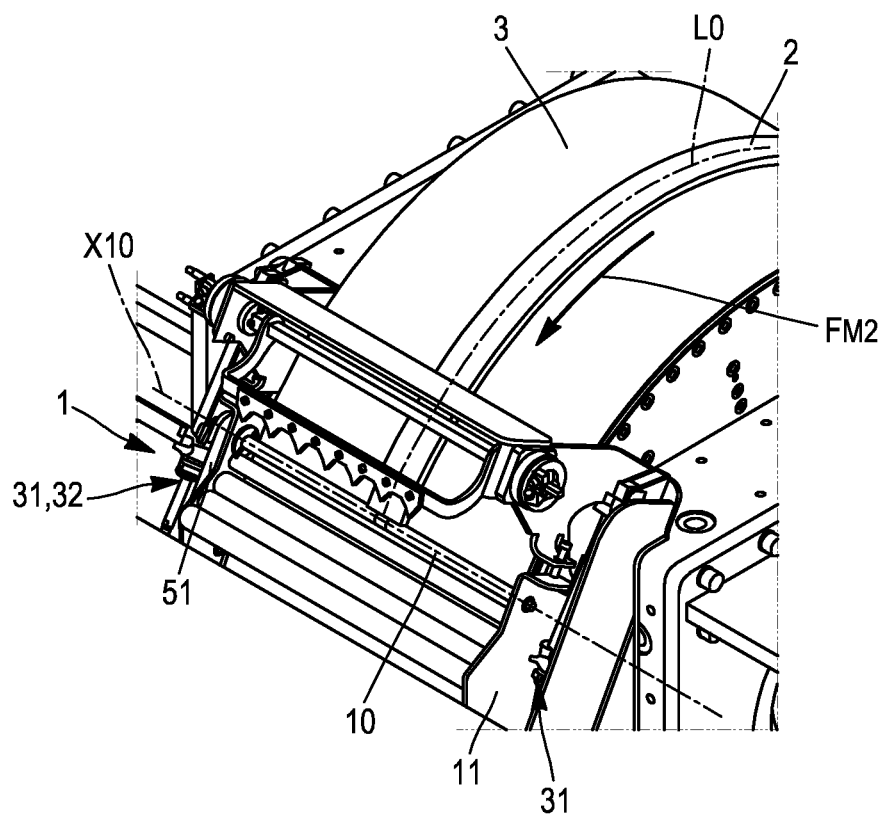
FIGS. 6 and 7 illustrate, respectively in perspective and sectional side views, a second phase of conveying a profiled element within the installation of FIGS. 1 and 2, during which the front edge of the profiled element comes into contact with the detachment roller, butting against said detachment roller.
Figure 7:
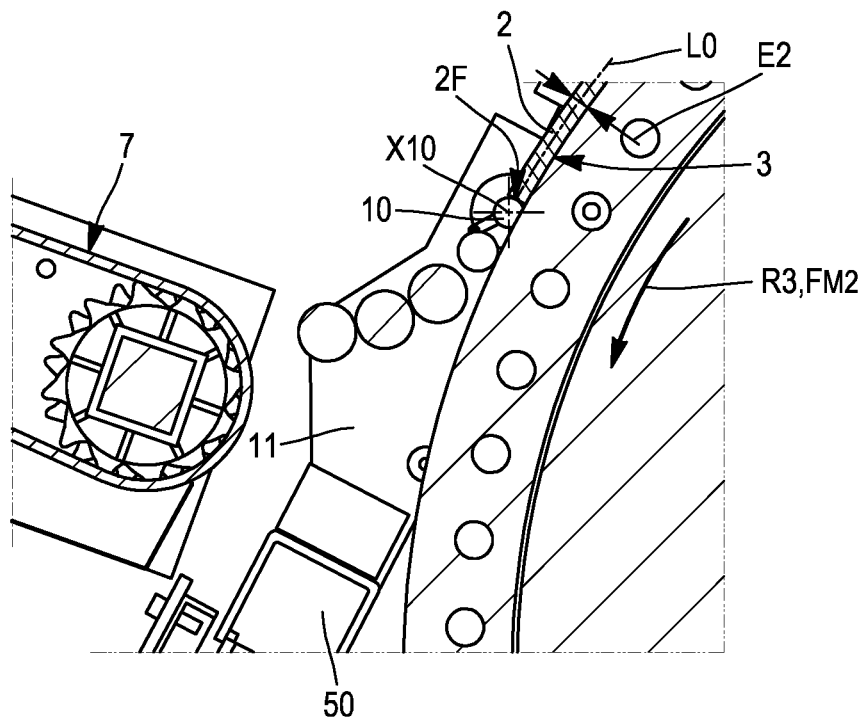

Such an arrangement of the detachment roller 10 allows the front edge 2F of said profiled element 2 to approach said detachment roller 10 from the side of said detachment roller, substantially or even exactly perpendicularly to the detachment axis X10, and to bear against the convex curved surface of said detachment roller 10, as is particularly visible in FIGS. 3, 6 and 7.

Preferably, the detachment axis X10 is parallel to the main axis X3.

The support 11 and the detachment roller 10 are further arranged in such a way that, in the engagement configuration C1, as illustrated in FIG. 3, the detachment axis X10 is situated at a distance H10 from the conveying surface 3 which is such that, on the one hand, a gap 12 remains between said detachment roller 10 and the conveying surface 3, that, on the other hand, the detachment roller 10 forms a stop which opposes the progression of the front edge 2F of the profiled element on the conveying surface 3 and prevents said front edge 2F from crossing the gap 12, and that, finally, there can be generated a rotation R10 of the detachment roller 10 about the detachment axis X10, termed "detachment rotation" R10, that constrains, or at the very least incites, the front edge 2F of the profiled element, and more generally the profiled element 2, to become detached from the conveying surface 3 so that the profiled element 2 can continue its advancing movement FM2 by bypassing and crossing the detachment roller 10 on the opposite side from the gap 12, while following said detachment rotation R10.

Thus, in the engagement configuration C1, the detachment roller 10 first of all makes it possible to block, very temporarily, the progression of the profiled element 2 along the conveying surface 3 when said profiled element 2 reaches and comes into contact with said detachment roller 10, just for the time necessary for the detachment rotation R10 to move the profiled element away from the gap by passing the profiled element 2 on the opposite side to said conveying surface 3 and to the gap 12, with respect to the detachment axis X10, to allow said profiled element 2, which is thus detached and moved away from the conveying surface 3, to continue its advancing movement FM2.

The detachment of the profiled element 2, and more particularly the detachment of the front edge 2F via which the passage of said profiled element 2 starts, is thus advantageously carried out in an automatic manner without requiring manual intervention by an operator, and without risk of damaging the profiled element 2 or causing any jamming.

Figure 11:
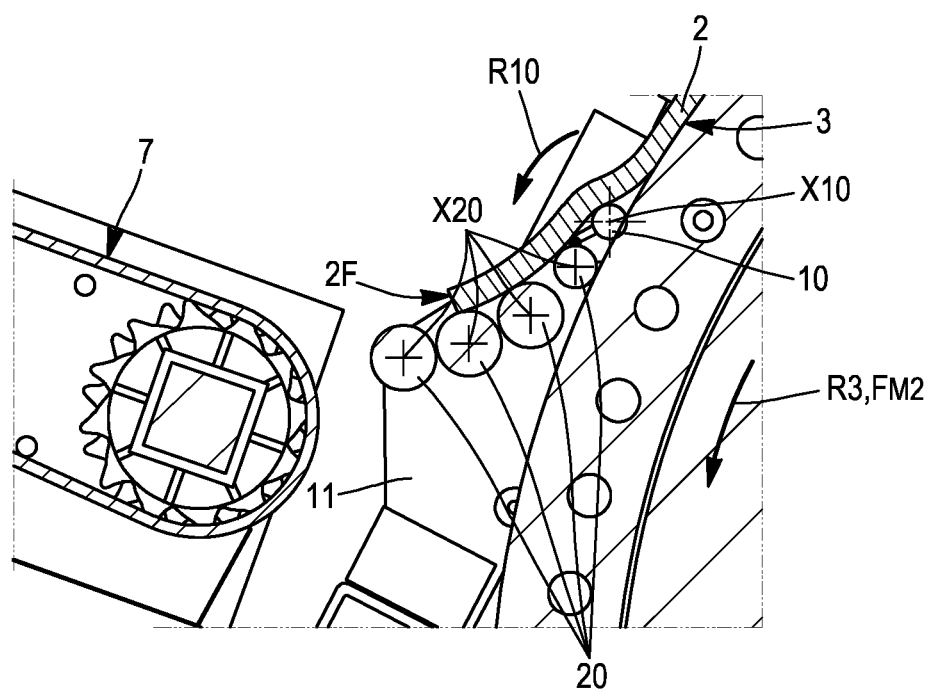

Advantageously, the presence of the gap 12 allows the detachment roller 10 not to touch the conveying surface 3, and therefore to maintain an independent rotation R10, the direction of which can conform to the direction of the advancing movement FM2 of the profiled element 2, without said direction of rotation being impeded by the individual movement, here the rotation R3, of the conveying surface 3. In particular, this prevents the movement of the conveying surface 3 from inducing a rotation of the detachment roller 10 that would tend to roll the profiled element 2 between said detachment roller 10 and the conveying surface 3. Quite on the contrary, it is observed here that the rotation R10 of the detachment roller 10, which is induced during the passage of the profiled element 2, and the rotation R3 of the conveying surface have the same direction, here an anticlockwise direction in FIGS. 9 and 11, to promote the peeling of the profiled element 2.

The height H12 of the gap 12, which corresponds to the smallest distance which separates the conveying surface 3 from the cylindrical wall of the detachment roller 10, and which is therefore measured here along an imaginary straight line perpendicular both to the external surface of the detachment roller 10 and to the conveying surface 3, and therefore radially to the detachment axis X10 and, where appropriate, radially to the main axis X3, therefore has a non-zero value, that is to say strictly greater than zero millimetres, preferably equal to or greater than 0.5 mm, or even equal to or greater than 1 mm.

Of course, the height H12 of the gap 12 will be strictly less than the thickness E2 of the profiled element, preferably equal to or less than 50% (half) of the thickness E2 of the profiled element, or even equal to or less than 30% of the thickness of the profiled element E2, so as to prevent the profiled element 2 from engaging with force through the gap 12 between the detachment roller 10 and the conveying surface 3, and therefore so as to avoid any jamming.

By way of illustration, the height of the gap H12 may ultimately be between 0.5 mm and half the nominal thickness E2 of the profiled element 2.

Figure 9:
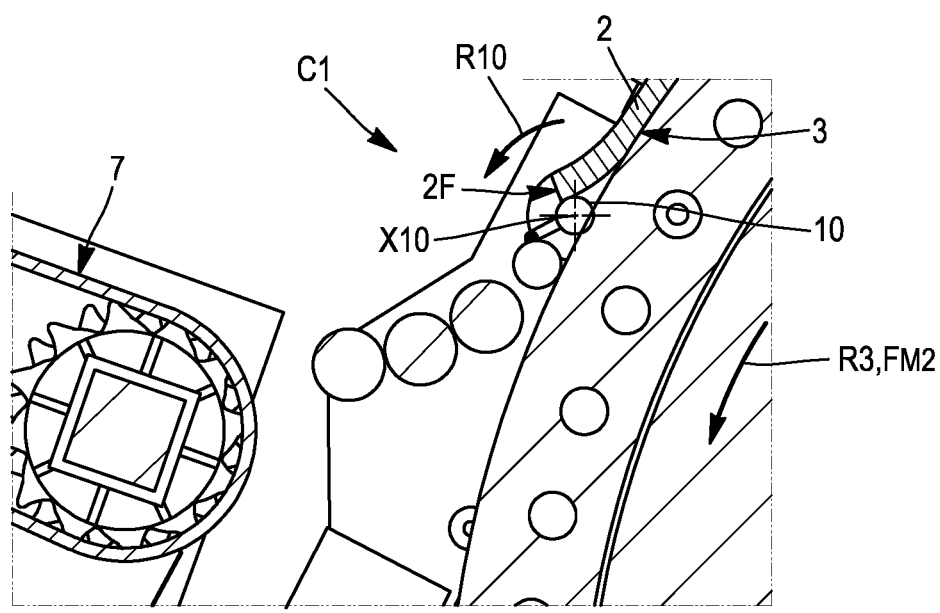
Figure 10:
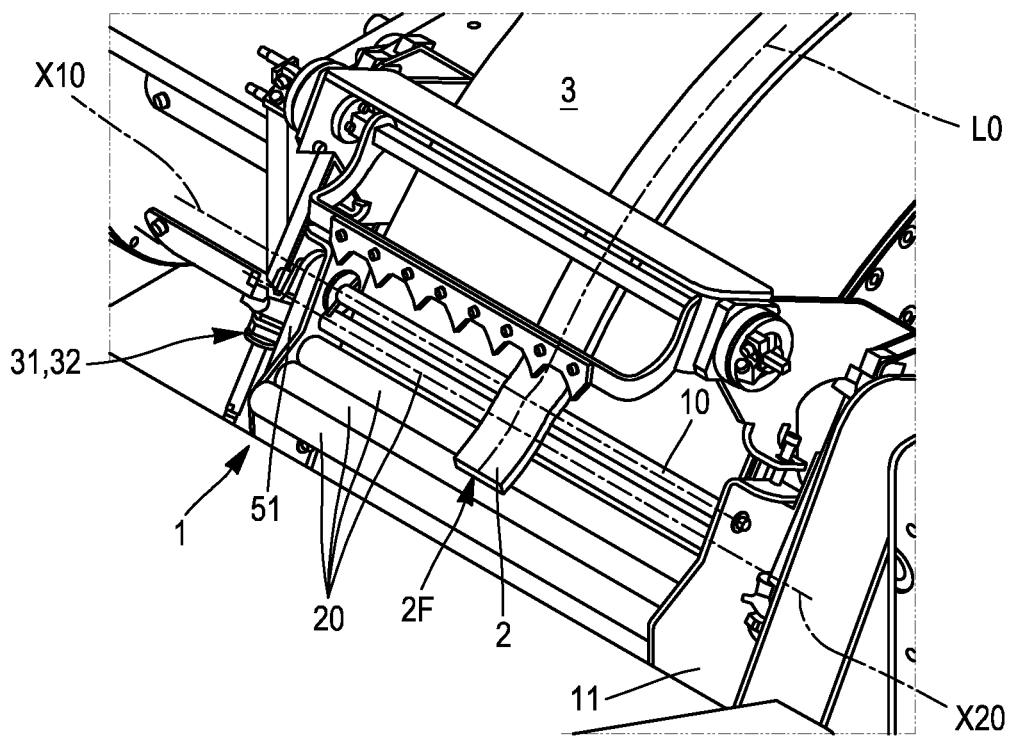
FIGS. 10 and 11 illustrate, respectively in perspective and sectional side views, a fourth phase of conveying a profiled element within the installation of FIGS. 1 and 2, during which the front edge of the profiled element continues to bypass the detachment roller and is guided, downstream of the detachment roller, by a succession of accompanying rollers.

Moreover, the proximity of the detachment roller 10 with respect to the conveying surface 3, which results from the small distance H10, termed "detachment axis height H10", which is imposed between the detachment axis X10 and the conveying surface 3, advantageously makes it possible to promote the crossing of the detachment roller 10 by the front edge 2F of the profiled element, in a path which allows said profiled element 2 to be raised and pass over said detachment roller 10, under the joint action of the detachment roller 10 and of the thrust generated by the advancing movement FM2, as is particularly illustrated in FIGS. 3 and 9.

This amounts as it were to frontally inserting, in the manner of a wedge, the detachment roller 10 between the front edge 2F of the profiled element and the conveying surface 3. It will be noted that, unlike a prismatic wedge which generates friction, this occurs by the detachment roller 10 here accompanying the progression of the profiled element 2 by rolling, by simply being set in rotation R10.

Thus, the profiled element 2 can be separated without force and without damage to the conveying surface 3, and can be moved away from said conveying surface 3 starting from the bifurcation point formed by the detachment roller 10 in order then to join the receiving surface 7.

According to a preferred possibility, in the engagement configuration C1, the distance H10 between the detachment axis 10 and the conveying surface 3 is equal to or less than the (nominal) thickness E2 of the profiled element 2.

This detachment axis height H10 can even preferably be equal to or less than 0.8 times the thickness E2 of the profiled element, equal to or less than 0.7 times the thickness E2 of the profiled element, or even equal to or less than 0.5 times the thickness E2 of the profiled element.

This particularly promotes the penetration effect of the detachment roller 10 between the profiled element 2 and the conveying surface 3.

Similarly, the diameter D10 of the detachment roller 10 will preferably be relatively small, so as to facilitate the insertion and the penetration of said detachment roller 10 between the profiled element 2 and the conveying surface 3, but nevertheless sufficiently large to avoid any excessive bending under the load of the profiled element 2.

The value of the diameter D10 of the detachment roller will preferably be less than twice the value of the (nominal) thickness E2 of the profiled element.

By way of illustration, the diameter D10 of the detachment roller may thus be between 2 mm (typically for a profiled element having a thickness of 1 mm to 2 mm) and 200 mm (typically for a profiled element having a thickness of the order of 100 mm).

Preferably, the diameter D10 of the detachment roller 10 will moreover be strictly less than the diameter of the main roller 3.

Moreover, the axial length of the detachment roller 10, measured along the detachment axis X10, and denoted W10, is advantageously greater than the width W2 of the profiled element 2. Preferably, said axial length W10 of the detachment roller 10 will be substantially equal to the width W3 of the conveying surface 3, for example between 80% and 120% of said width W3, and more preferably equal to said width W3 of the conveying surface 3.

The take-up of the profiled element 2 by said detachment roller 10 will thus be well distributed over the whole width of the profiled element 2, without risk of deformation or tearing of the profiled element 2.

The installation 5 moreover comprises a frame 13 which carries the conveying surface 3, and with respect to which said conveying surface 3 is driven with the advancing movement FM2, here preferably by the rotation R3 about the main axis X3.

The support 11 of the separation device 1 is advantageously arranged to cooperate with said frame 13 so as to be able to place and maintain the detachment roller 10, and more particularly the detachment axis X10, in the engagement configuration C1, in a predetermined nominal position with respect to the frame 13, which satisfies the gap 12 height H12 and detachment axis X10 height H10 conditions indicated above, and to retain said detachment axis 10 in said predetermined nominal position or in the immediate vicinity of said predetermined nominal position, counter to the forces generated by the advancing movement FM2 of the profiled element 2 and of the conveying surface 3.

Thus, the position of the detachment axis X10 with respect to the frame 13 remains fixed, or substantially fixed, during the detachment of the profiled element 2, such that the detachment axis X10 resists the forces generated against the detachment roller 10 by the profiled element 2, under the thrust of the conveying surface 3, in a sufficient measure to cause the penetration of the detachment roller 10 between the lower face of the profiled element 2 and the conveying surface 3, and therefore the detachment of said profiled element 2.

Preferably, as is clearly visible for example in FIGS. 1, 2, 4 and 10, the separation device 1 comprises a plurality of auxiliary rollers 20 which are mounted rotatably on the support 11 and arranged in succession to one another and in succession to the detachment roller 10, parallel to said detachment roller 10, in order to accompany the profiled element 2 when the latter has crossed the detachment roller 10.

Said auxiliary rollers 20 are advantageously arranged in a row, with their respective axes of rotation X20 arranged parallel to one another and parallel to the detachment axis X10, to form a sort of auxiliary roller belt 20 which guides the profile 2 in a well-determined path to the entry of the receiving surface 7.

Said auxiliary rollers 20 are spaced apart from one another by intervals whose size is strictly less than the thickness E2 of the profiled element.

The presence of the intervals advantageously makes it possible for the auxiliary rollers 20 to be each set in rotation independently of the other auxiliary rollers 20, and independently of the detachment roller 10, without interference.

Furthermore, the relative narrowness of said intervals advantageously makes it possible to prevent the profiled element 2 from being accidentally insinuated between two successive auxiliary rollers 20. It is therefore ensured that said profiled element 2 is maintained on the auxiliary roller belt 20 as the front edge of the profiled element 2F, continuing its advancing movement FM2 beyond the detachment roller 10, engages on said auxiliary rollers 20, one after the other.

Preferably, the auxiliary rollers 20 accompany the profiled element 2 in a curved path which deviates from the conveying surface 3, and more particularly in a path which has for this purpose a curvature which is of opposite sign to the curvature of the conveying surface 3.

Thus, the guidance offered by the separation device 1 allows the profiled element to diverge progressively and smoothly from the conveying surface 3 to join the receiving surface 7.

For this purpose, the axes of rotation of the auxiliary rollers 20 will advantageously be distributed on the support 11 in a curved line which corresponds to the desired curved path.

Preferably, the auxiliary rollers 20 have diameters greater than the diameter D10 of the detachment roller 10.

Thus, the detachment roller 10 forms a sort of relatively fine point, which facilitates a precise approach to the conveying surface 3 and a penetration between the profiled element 2 and the conveying surface 3.

Conversely, by choosing a large diameter for the auxiliary rollers 20, it is possible to limit the number of auxiliary rollers 20 necessary for guiding the profiled element 2 to the receiving surface 7, since each auxiliary roller 20 covers a portion of the path that is longer than the portion covered by the detachment roller 10.

According to one embodiment possibility, all the auxiliary rollers 20 may have the same diameter.

According to another embodiment possibility, the auxiliary rollers 20 could have increasing diameters in the downstream direction.

Figure 12:
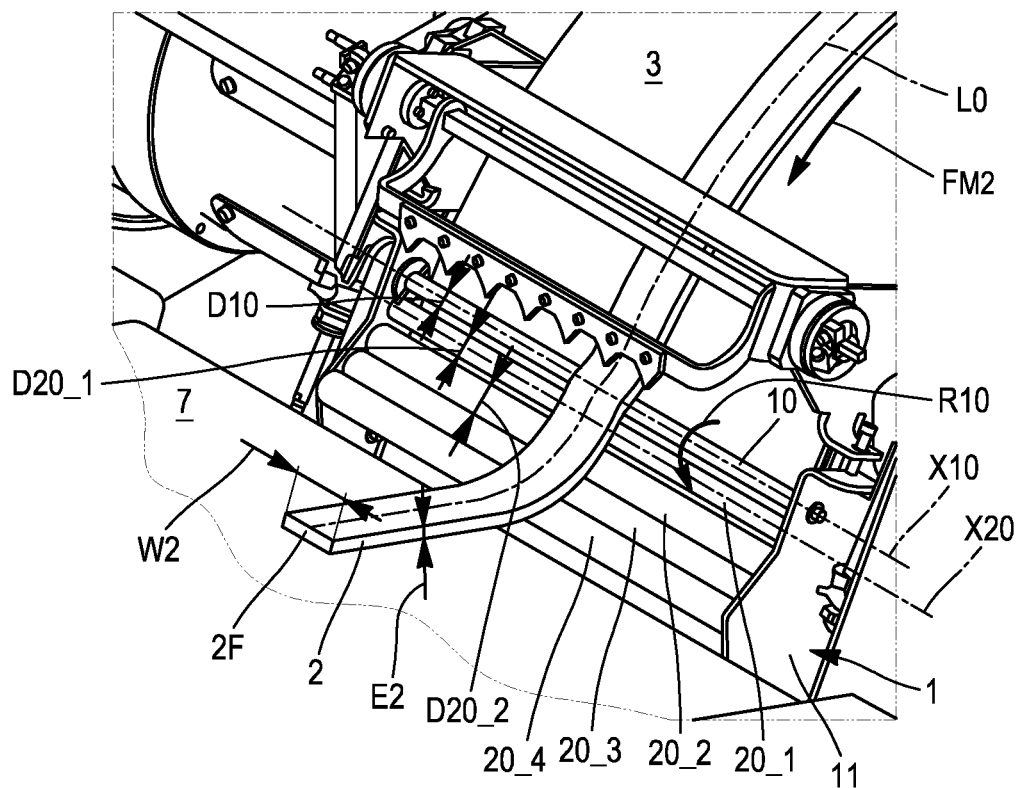
FIGS. 12 and 13 illustrate, respectively in perspective and sectional side views, a fifth phase of conveying a profiled element within the installation of FIGS. 1 and 2, during which the front edge of the profiled element reaches a destination receiving surface, here a conveyor belt, which is situated at a distance from the conveying surface, downstream of the separation device.
Figure 13:
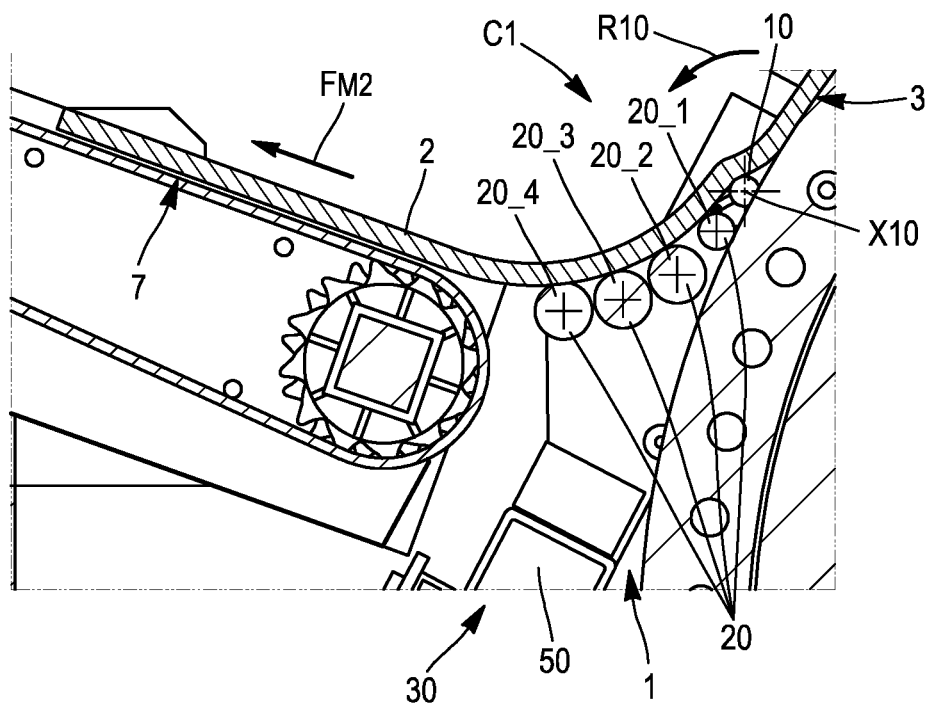
Figure 14:
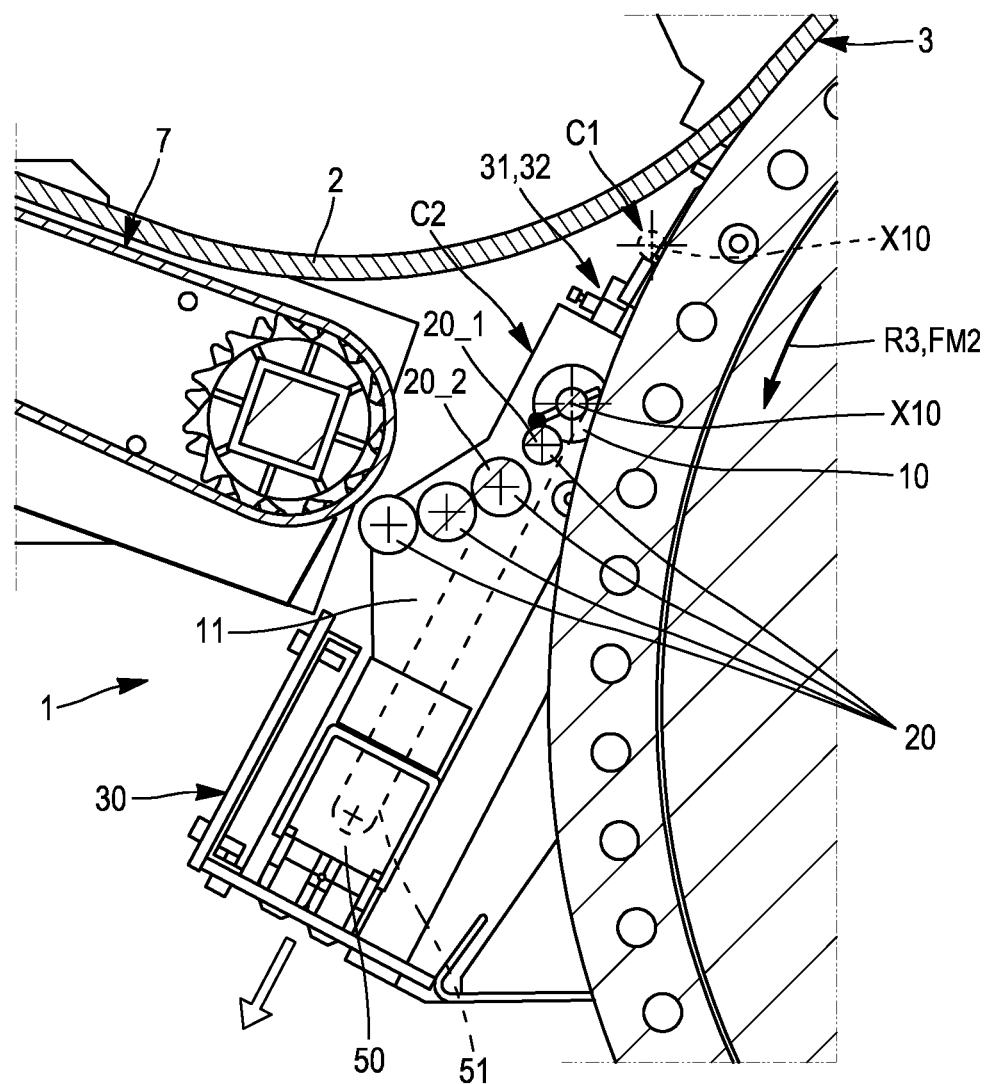
FIG. 14 illustrates, in a sectional side view, a possible sixth phase of conveying the profiled element, during which a steady production state is established, and the support of the detachment roller is placed so as to be set back, in a disengagement configuration, in order to no longer interfere with the profiled element which is supported by the upstream conveying surface and by the downstream receiving surface.

In particular, as is visible in FIGS. 12 and 14, there may be provision that, from upstream to downstream, a first auxiliary roller 20_1, which immediately follows the detachment roller 10, has a diameter D20_1 greater than the diameter D10 of the detachment roller 10, and that a second auxiliary roller 20_2, which immediately follows the first auxiliary roller 20_1, has a diameter D20_2 greater than that D20_1 of said first auxiliary roller 20_1.

The following auxiliary rollers 20_3, 20_4, here the two following auxiliary rollers, may have a diameter equal to that D20_2 of the second auxiliary roller 20_2.

Moreover, the axial length of each auxiliary roller 20, denoted W20 and measured along its axis of rotation X20, will preferably be equal from one auxiliary roller 22 the other, and preferably substantially equal to the length W10 of the detachment roller, and for example between 80% and 120% of the width W3 of the conveying surface 3, or even equal to said width W3 of the conveying surface 3.

Here again, this will ensure a sufficient width, preferably a substantially constant width, of the path of rollers 3, 10, 20 followed by the profiled element 2, and therefore homogeneous take-up of the profiled element 2, without risk of impairment of said profiled element 2 or of jamming.

Preferably, the auxiliary rollers 20 are mounted to freely rotate on the support.

Thus, the auxiliary rollers 20 advantageously form an idle-roller belt which is particularly compact and lightweight and puts up virtually no resistance to the progression of the profiled element 2 in the advancing movement FM2 as soon as the front edge 2F of the profiled element has overcome and passed beyond the detachment roller 10.

Preferably, the detachment roller 10 and the auxiliary rollers 20 are bare and independent of one another, in that they are not covered by a common belt or band that would surround said rollers 10, 20 and would lock their respective rotations. Advantageously, the use of bare rollers that are not covered by an extra belt thickness makes it possible to maintain rollers 10, 20, in particular a detachment roller 10, with a particularly small diameter and to avoid any risk of interference or of friction between said detachment roller 10, and more generally the separation device 1, and the conveying surface 3, even when the separation device is close to the conveying surface 3 and the gap 12 is relatively narrow.

Preferably, as is particularly visible in FIG. 14, the separation device 1 comprises a detachment motor 50 which is designed to generate the detachment rotation R10 with which the detachment roller 10 is driven with respect to the support 11.

Advantageously, such a detachment motor 50 makes it possible to generate an active detachment rotation R10, preferably even before the front edge 2F of the profiled element reaches the detachment roller 10, which makes it possible to actively deviate the front edge 2F of the profiled element in the right direction, away from the gap 12, as soon as contact is established between the profiled element 2 and the detachment roller 10.

Peeling is thus promoted, particularly when the front edge 2F of the profiled element has a small thickness, and in particular in the cases where the thickness E2 of the profiled element does not exceed the detachment axis height H10 or does not exceed the total height of the detachment roller 10 with respect to the conveying surface 3.

The detachment motor 50 may drive the detachment roller 10 by any suitable movement transmission member, for example by means of a belt 51, as is visible in FIGS. 6, 8, 10 and 14.

The detachment motor 50 may advantageously be housed between the two lateral branches of the support 11, in the available space situated below the auxiliary rollers 20, between the main roller 3 and the downstream receiving surface 7.

Preferably, the separation device 1 comprises a selector which makes it possible to select between, on the one hand, an active detachment mode, according to which the detachment motor 50 is activated so as to actively drive the detachment roller 10 in the detachment rotation R10 with respect to the support 11, and, on the other hand, a passive detachment mode, in which said detachment motor 50 is deactivated and/or disconnected from the detachment roller (for example by means of a declutching system) so as to allow the detachment roller 10 to rotate freely.

The active detachment mode will be particularly preferred when the profiled element 2 has a small thickness E2 with respect to the diameter D10 of the detachment roller and/or with respect to the detachment axis height H10.

Conversely, the passive detachment mode may be preferred when the production reaches a steady state which allows the downstream receiving surface 7 to contribute to peeling, or else when the profiled element 2, and more particularly its front edge 2F, has a thickness E2 much greater than the detachment axis height H10, and/or a relatively low tack, thus promoting a natural detachment of the profiled element 2 by the detachment roller 10 in simple reaction to the thrust exerted by the advancing movement FM2. In this passive mode, the detachment roller 10 is idle and non-motorized in such a way as to be driven naturally in rotation R10 in a passive manner, without putting up resistance, under the effect of the advancing movement FM2 of the profiled element 2 which engages on the surface of said detachment roller 10.

Preferably, the detachment rotation R10 is such that the norm of the tangential speed of the surface of the detachment roller 10, at the point where the profiled element 2 comes into contact with said surface of the detachment roller 10, is equal to the norm of the tangential speed of the conveying surface 3, in the longitudinal direction L0, at the point where said profiled element 2 separates from said conveying surface 3.

Thus, there will be no speed discontinuity, and therefore no impact of or damage to the profiled element (by settling or, by contrast, by elongation) when the profiled element 2 will leave the conveying surface 3 to pass onto the surface of the detachment roller 10.

In passive detachment mode, since the detachment roller 10 is free to rotate, this speed continuity will be created naturally.

In active detachment mode, the speed continuity will be ensured by the control unit, which will therefore control the detachment motor 50, and therefore the detachment rotation R10, according to the speed of the conveying surface 3, here more particularly according to the speed of rotation R3 of the main roller 3.

The detachment motor 50 can be controlled, and in particular synchronized with the motor 6 which drives the conveying surface 3, by means of the same electronic control unit as that which controls the motor 6 of the conveying surface 3.

Figure 4:
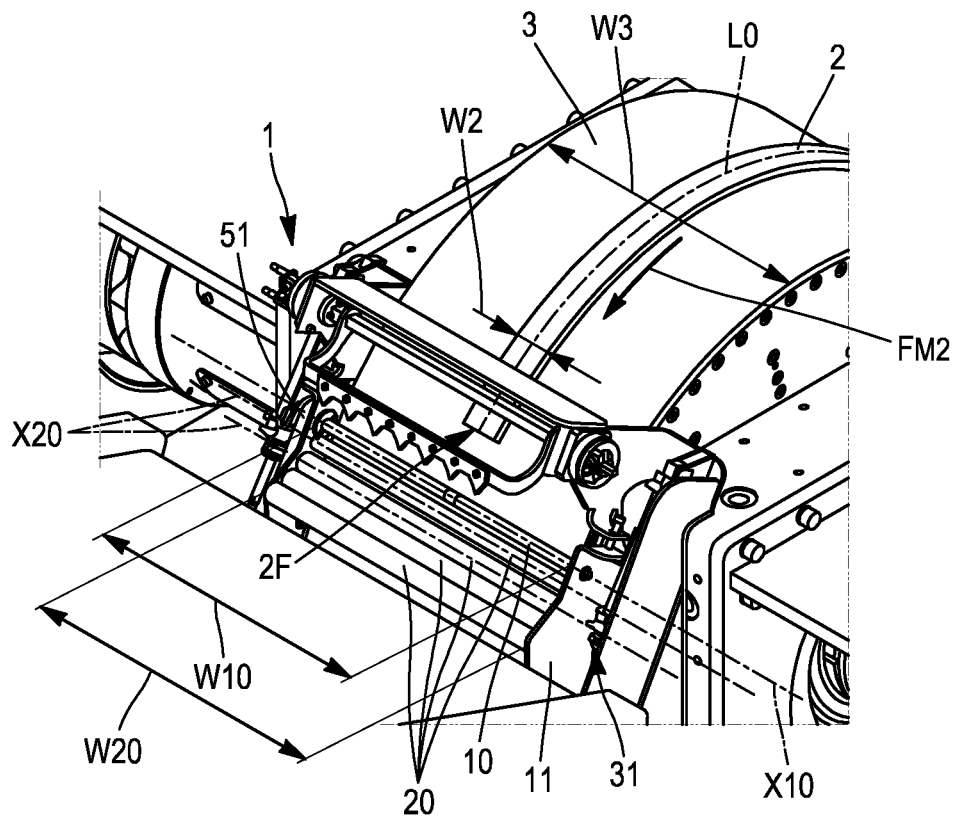
FIGS. 4 and 5 illustrate, respectively in perspective and sectional side views, a first phase of conveying a profiled element within the installation of FIGS. 1 and 2, during which, at the start of a production cycle, the profiled element is caused to progress in the direction of the detachment roller.
Figure 5:
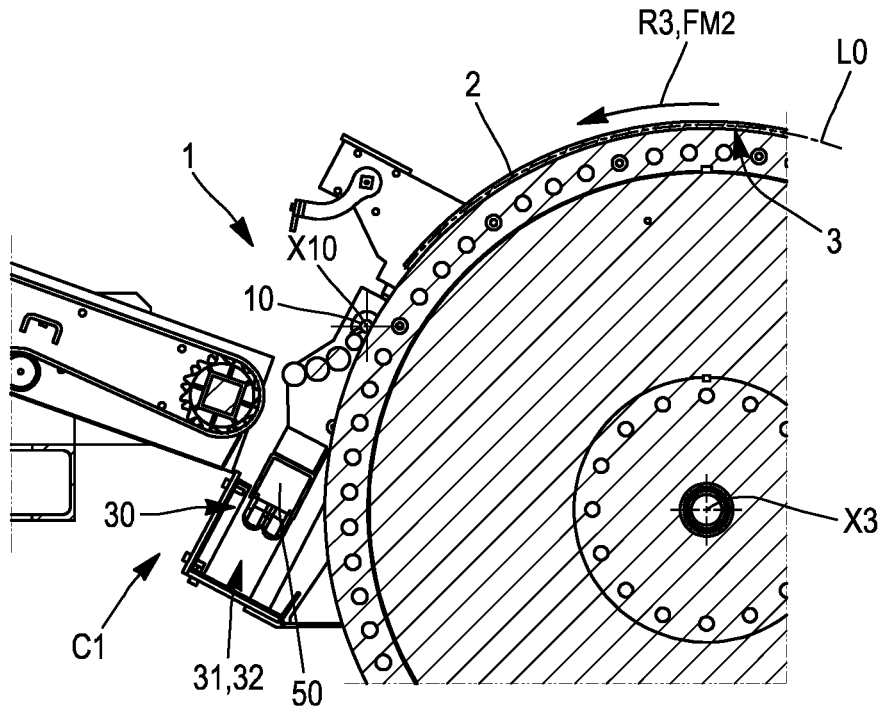
Figure 15:
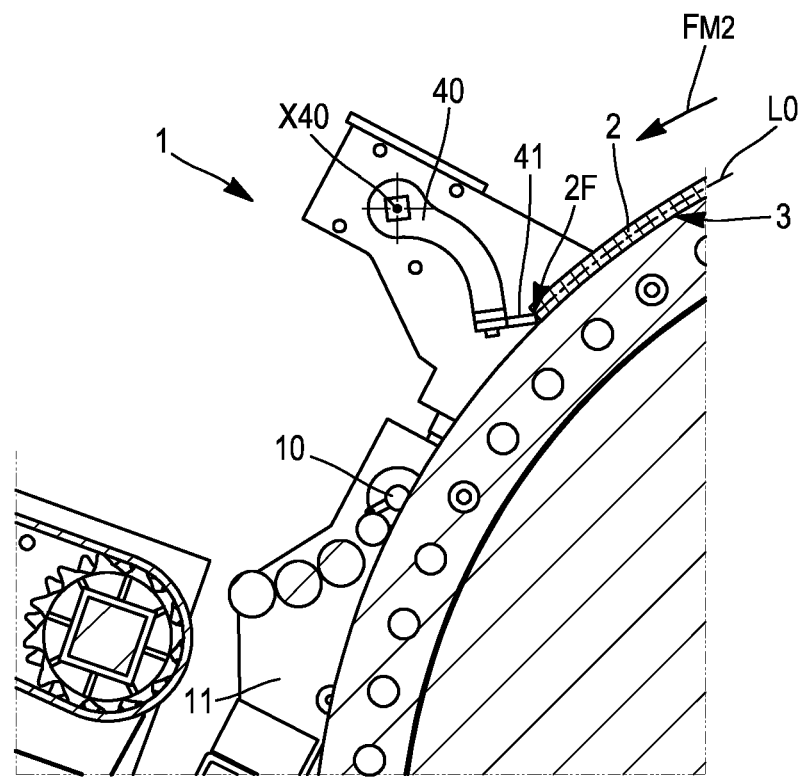
FIG. 15 illustrates, in a sectional side view, a variant of the separation device according to the invention which, in order to facilitate the detachment of the profiled element, employs a tilting harrow which has a row of teeth against which the front edge of the profiled element pokes.

Preferably, as is visible in particular in FIGS. 1, 4 and 15, the support 11 is carried by a positioning mechanism 30 which makes it possible to adjust the distance of the support 11, and therefore of the detachment axis (X10), with respect to the conveying surface (3).

The carriage 11, and therefore the detachment axis X10, can thus be alternatively moved towards or away from the conveying surface 3 on the command of the control unit.

The positioning mechanism 30 may in particular allow the detachment axis height H10 to be adapted according to the thickness E2 of the profiled element 2 to be produced.

Alternatively or additionally, the positioning mechanism 30 may make it possible to retract the support 11 and the detachment roller 10 such that they are set back from the path followed by the profiled element 2, either because it is no longer useful to assist the profiled element 2 to allow it to be detached from the conveying surface 3, or because it is necessary to gain access to the interior of the installation 5, and in particular to the conveying surface 3, for a cleaning or maintenance operation.

Thus, preferably, the positioning mechanism 30 will make it possible to selectively place the support 11, and the detachment roller 10, either in the engagement configuration C1 mentioned above, for example an engagement configuration in which the distance H10 between the detachment axis X10 and the conveying surface 3 is less than the thickness E2 of the profiled element 2, such that the detachment roller 10 can cooperate with the profiled element 2 to separate said profiled element 2 from the conveying surface 3, as is shown in FIGS. 1, 5, 7, 9, 11 and 13, and in dotted lines in FIG. 14, or in a disengagement configuration C2 in which, as illustrated in FIG. 14, once the profiled element 2 is engaged on a receiving surface 7 separate from the conveying surface 3 and situated at a distance from said conveying surface 3 downstream of the separation device 1, said separation device 1, and in particular the detachment roller 10, is disengaged from said profiled element 2 so as to no longer touch said profiled element 2.

The disengagement configuration C2 will thus make it possible to place the detachment roller 10, and more generally the separation device 1, in a set-back position from the path followed by the profiled element 2, in a position in which said separation device 1 no longer interacts, and no longer interferes, with the progression of the profiled element 2 or with the movement of the conveying surface 3.

Preferably, the engagement configuration C1 is used at the start of production of the profiled element 2, when it is necessary to actively intervene to detach and deviate the front edge 2F of the profiled element 2 in order to feed said profiled element 2 up and onto the receiving surface 7.

The disengagement configuration C2 is, for its part, preferably implemented once the steady production state has been achieved and once the profiled element 2 extends continuously from the conveying surface 3 to the receiving surface 7 so as to be sufficiently supported by these two surfaces 3, 7 in order that the longitudinal traction action exerted by the receiving surface 7, which is itself movable and driven downstream by a suitable motor, is sufficient to ensure the peeling of the profiled element 2 upstream, at the conveying surface 3.

The positioning mechanism 30 can, for example, comprise a, preferably rectilinear, guide rail which is mounted on the frame 13 and guides the support 11 translationally, in the manner of a carriage.

The guide rail, and therefore the path taken by the support 11 and the detachment roller 10 to reach their engagement position C1, are preferably oriented substantially along, or parallel to, the imaginary straight line which is tangent to the conveying surface 3, here tangent to the main roller 3, at the point where it is desired to perform the separation between the profiled element 2 and said conveying surface 3.

The support 11 may be driven along the rail by any suitable drive system, for example by a cylinder 31, in particular a pneumatic cylinder.

Figure 8:
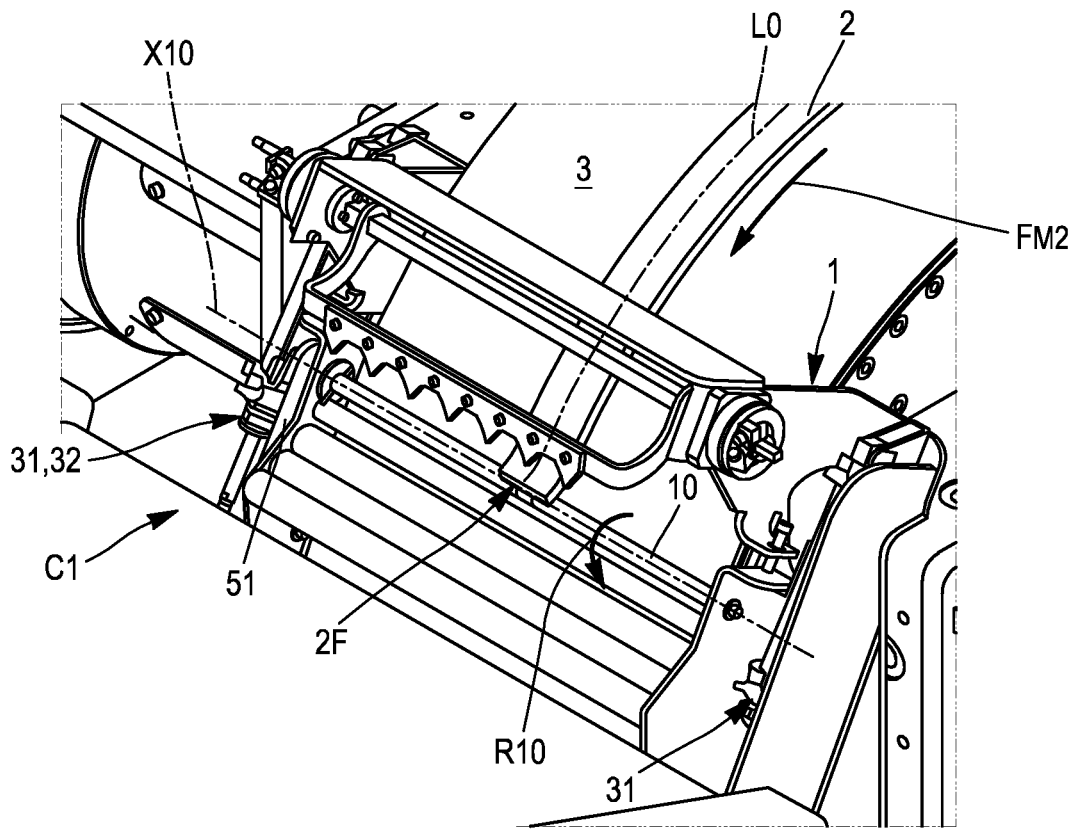
FIGS. 8 and 9 illustrate, respectively in perspective and sectional side views, a third phase of conveying a profiled element within the installation of FIGS. 1 and 2, during which the front edge of the profiled element starts to detach from the conveying surface to bypass the detachment roller.

More particularly, as is visible in FIGS. 4, 6 and 8, the positioning mechanism 30 may comprise two cylinders 31, which are arranged on either side of the detachment roller 10 and the auxiliary rollers 20, along lateral branches of the support 11 that are oriented substantially normal to the detachment axis X10, and preferably substantially parallel to the direction of the tangent to the longitudinal direction L0 at the point where the profiled element 2 is detached from the conveying surface 3.

According to a preferred feature which can constitute a wholly separate invention, the positioning mechanism 30 has a damping member 32 which allows the support 11, and more particularly the detachment roller 10, when said detachment roller 10 is in the engagement configuration C1, to recoil elastically under the thrust of the profiled element 2.

Preferably, the separation device 1 then comprises a monitoring system which is capable of detecting if the recoiling movement of the support 11 exceeds a predetermined threshold.

Advantageously, said threshold will be fixed to typically correspond to a jamming situation in which the profiled element 2 has not been able to overcome the detachment roller 10 as intended, and therefore exerts a pressure, greater than a predetermined value, on said detachment roller 10.

Preferably, the positioning mechanism 30 is oriented in such a way that the pressure exerted by the profiled element 2 on the detachment roller 10, in particular in a jamming situation, is oriented substantially in a direction which tends to push the support 11 and the detachment roller 10 counter to the cylinder 31 towards the position that they occupy in the disengagement configuration C2.

Preferably, in the case of detecting a crossing of the threshold, the monitoring system will emit an alert and will cause a safety shutdown of the installation 5.

Preferably, the positioning mechanism 30 is driven by a pneumatic cylinder 31, which also forms the damping member 32.

To this end, use will preferably be made in the cylinder 31 of a relatively low pressure, for example an absolute pressure of between 1.5 times and 7 times the ambient atmospheric pressure, to maintain the support 11 in the engagement configuration C1, and the compressibility of the air contained in said cylinder 31 will be used to obtain the elastic effect and the stiffness which are sought to accommodate the elastic recoil of the detachment roller 10.

One and the same mechanism 30 can thus at the same time ensure the function of positioning and the function of elastic suspension of the support 11 and of detection of a jam.

In a variant, the damping member 32 could be formed by a spring, or a spring/damper assembly.

Moreover, according to one possible variant embodiment, which can preferably be combined with a detachment roller 10 as described above or even constitute a wholly separate invention, the separation device 1 can comprise, as is visible in FIGS. 15 to 22, a tilting harrow 40 which is mounted pivotably about an axis, termed "harrow axis" X40, which is parallel to the conveying surface 3 and transverse and preferably perpendicular to the longitudinal direction L0.

Figure 16:
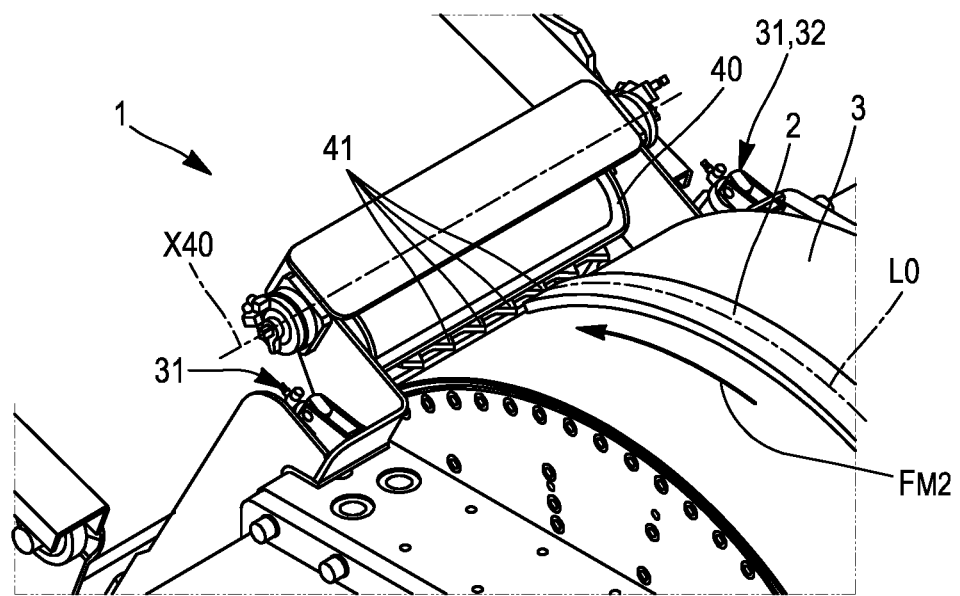
FIG. 16 is a perspective detail view of the arrangement of the teeth of the harrow of FIG. 15.

As is visible in FIG. 16, said harrow 40 has a row of teeth 41 which are, at least initially, in a standby configuration, positioned opposite the conveying surface 3 at a distance from said conveying surface that is non-zero and strictly less than the thickness E2 of the profiled element.

Figure 17:
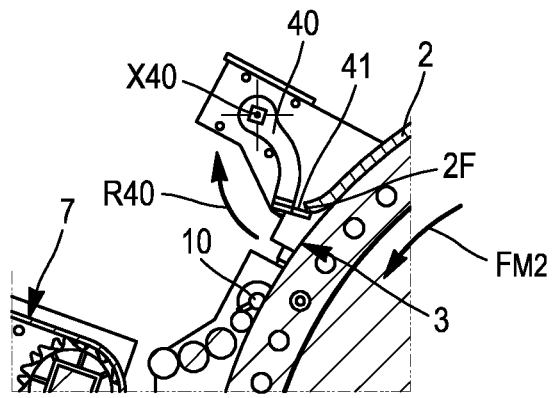
FIGS. 17, 18, 19, 20, 21 and 22 illustrate, in sectional side views, the successive phases of employing the harrow at the start of a production cycle, where the tilting of the harrow makes it possible to detach the front edge of the profiled element from the conveying surface and to give said front edge, by plastic deformation, an upright shape which first of all facilitates the engagement of said front edge of the profiled element with the detachment roller and then the channeling of the profiled element through the separation device.
Figure 18:
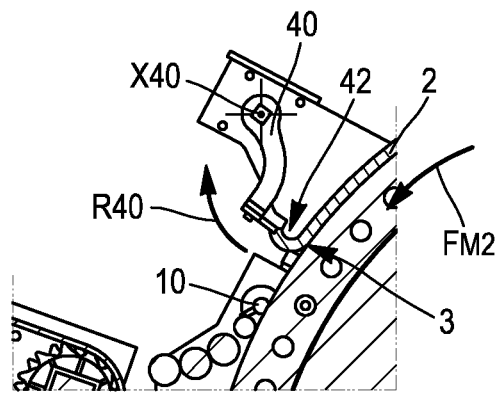
Figure 19:
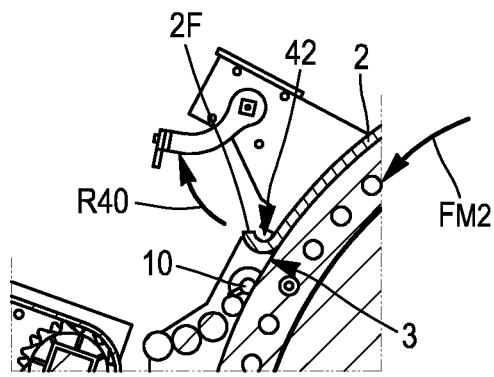
Figure 20:
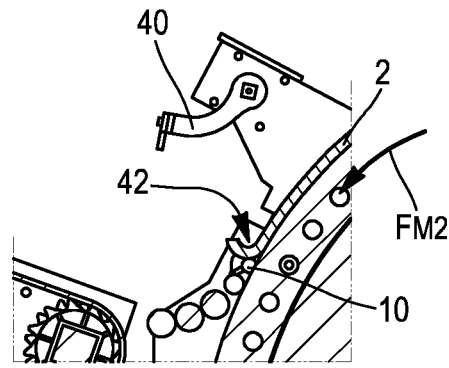
Figure 21:
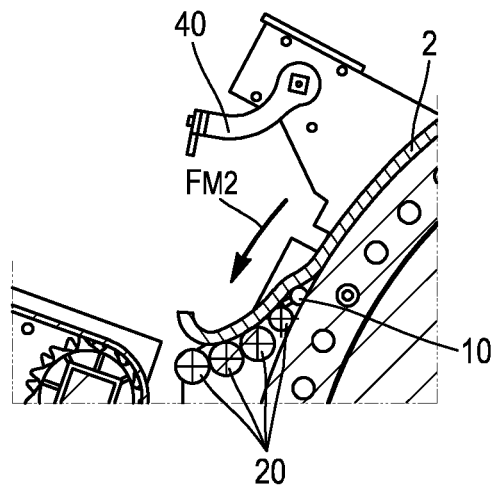

In this way, when the profiled element is subjected to an advancing movement FM2 in the longitudinal direction L0 on, and preferably by, the conveying surface 3, the front edge 2F of said profiled element pokes onto the teeth 41 (FIG. 15) and causes a tilting R40 of the harrow 40 about the harrow axis X40, the consequence of which tilting R40 is to detach the front 2F of the profiled element from the conveying surface 3 (FIGS. 17 and 18).

Figure 22:
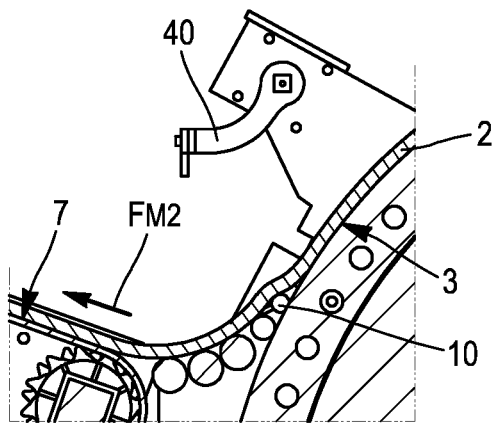

More particularly, the harrow 40 may be positioned upstream of the detachment roller 10 so as to be able to intercept the front edge 2F of the profiled element which pokes into the teeth 41 (FIG. 15), and to then be able, when starting its tilting R40, to raise and detach the front 2F of the profiled element from the conveying surface 3 (FIG. 17), and, in combination with the advancing movement FM2, straighten up said front 2F of the profiled element so as to form a U-shaped bend 42 (FIG. 18) which, when the profiled element 2 is detached from the harrow 40 while said harrow 40 continues its tilting R40 and moves away to reach a disengagement configuration (FIG. 19), can continue its progression to the detachment roller 10 (FIG. 20), at which the excess thickness and the rounding that are formed by said bend 42 facilitate the crossing of said detachment roller 10 and also the continuation of the progression of the profiled element 2 on the auxiliary rollers 20 (FIG. 21) and then on the downstream receiving surface 7 (FIG. 22).

It will be noted in this respect that the use by the separation device 1 of a detachment roller 10 according to the invention, in particular in the absence of a harrow 40, makes it possible to exploit, in order to detach the profiled element 2, a large totally clear space which corresponds to that region of the space situated radially beyond the detachment roller 10 with respect to the conveying surface 3 and to the main axis X3. Insofar as said space is clear, and free from mechanical members, there is no risk of jamming.

It will also be noted that, preferably, the detachment roller 10 and the auxiliary rollers 20 are situated below the profiled element 2, that is to say at an altitude lower than that of the profiled element 2, so as to form a sort of cradle which naturally receives said profiled element 2 in a very stable manner by means of gravity.

Moreover, it will be noted that, according to a preferred embodiment possibility which may constitute a wholly separate invention, there may be generated, within the installation 5, at the front edge 2F of the profiled element, upstream of the position of the detachment roller 10 with respect to the advancing movement FM2, either a material bead, or a fold, or a partial detachment of said front edge 2F of the profiled element, or a combination of such elements, so as to give said front edge 2F of the profiled element an excess thickness with respect to the nominal thickness E2 of said profiled element 2, with the result that said front edge 2F of the profiled element has, when it reaches the detachment roller 10, a height with respect to the conveying surface 3, termed "apparent height", that is greater than the nominal thickness E2 of the profiled element, thereby facilitating the crossing of the detachment roller 10 by said front edge 2F of the profiled element, in the direction of the detachment rotation R10.

In other words, an excess thickness or a pre-detachment of the front edge 2F of the profiled element may be intentionally brought about to facilitate the separation of the profiled element 2 from the conveying surface 3 by a detachment roller 10.

The pre-detachment may, for example, be obtained by a tilting harrow 40 as described above. A bead may, for its part, be formed at the start of the extrusion of the profiled element 2 by suitable management of the initial extrusion conditions, and in particular by a suitable configuration and/or management of the die 4 and/or of the gap 8.

The apparent height here corresponds to the maximum height of the front edge 2F of the profiled element, measured normal to the conveying surface 3, that is to say here radially to the surface of the main roller 3, at the moment when said front face 2F is opposite the detachment roller 10 and comes into contact with said detachment roller.

By way of illustration, the excess thickness thus given to the front edge 2F of the profiled element 2 may bring the apparent height of the profiled element 2, considered locally at the level of said front edge 2F, to a value equal to or greater than 1.5 times, 2 times, or 3 times or even 5 times, the nominal thickness E2 of the profiled element 2.

It will be noted that the passive detachment rotation mode R10, that is to say in free rotation, or the active detachment rotation mode R10, that is to say actively motorized, may also be selected as a function of the apparent height of the front edge 2F of the profiled element, and in particular as a function of the ratio of the apparent height to the nominal thickness E2 of the profiled element, and/or as a function of the ratio between the apparent height and the diameter D10 of the detachment roller 10 or the detachment axis height H10.

Of course, the invention is in no way limited solely to the variants described in the foregoing, with persons skilled in the art being able in particular to isolate the aforementioned features or combine them freely with one another, or to replace them by equivalents.

The invention claimed is:

1. A separation device intended to separate a profiled element from a conveying surface which conveys the profiled element in a longitudinal direction so as to forward the profiled element with an advancing movement in a direction of which the profiled element displays a free end front edge, the separation device comprising:
    a detachment roller which is mounted so as to be able to rotate on a support about a detachment axis, and which is intended to be interposed between the profiled element and the conveying surface in order to cause the profiled element to become detached from the conveying surface,
    the support and the detachment roller being arranged to be able to adopt an engagement configuration, in which the detachment axis is oriented transversely to the longitudinal direction and parallel to the conveying surface, and in which the detachment axis is situated at a distance from the conveying surface which is such that a gap remains between the detachment roller and the conveying surface, that the detachment roller forms a stop which opposes a progression of the free end front edge of the profiled element on the conveying surface and prevents the free end front edge from crossing the gap, and that a detachment rotation of the detachment roller can be generated about the detachment axis that constrains the free end front edge of the profiled element to become detached from the conveying surface so that the profiled element can continue advancing movement by bypassing and crossing the detachment roller on an opposite side from the gap, while following the detachment rotation; and
    a detachment motor designed to generate the detachment rotation according to which the detachment roller is driven with respect to the support.

2. The separation device according to claim 1, wherein the detachment motor operates between an active detachment mode, according to which the detachment motor is activated so as to actively drive the detachment roller in the detachment rotation with respect to the support, and a passive detachment mode, in which the detachment motor is deactivated and/or disconnected from the detachment roller so as to allow the detachment roller to rotate freely.

3. The separation device according to claim 1, wherein the detachment rotation is such that a norm of a tangential speed of a surface of the detachment roller, at a point where the profiled element comes into contact with the surface of the detachment roller, is equal to a norm of a tangential speed of the conveying surface, in the longitudinal direction, at a point where the profiled element is separated from the conveying surface.

4. The separation device according to claim 1, wherein, in the engagement configuration, the distance between the detachment axis and the conveying surface is equal to or less than a thickness of the profiled element, or equal to or less than 0.8 times the thickness of the profiled element, equal to or less than 0.7 times the thickness of the profiled element, or even equal to or less than 0.5 times the thickness of the profiled element.

5. The separation device according to claim 1, further comprising a plurality of auxiliary rollers which are mounted rotatably on the support and arranged in succession to one another and in succession to the detachment roller, parallel to the detachment roller, and being spaced from one another by intervals a size of which is strictly less than a thickness of the profiled element, in order to accompany the profiled element, when the latter has crossed the detachment roller, in a curved path which deviates from the conveying surface.

6. The separation device according to claim 5, wherein the auxiliary rollers have diameters greater than a diameter of the detachment roller.

7. The separation device according to claim 1, wherein the support is carried by a positioning mechanism, comprising a rectilinear guide rail, which makes it possible to adjust a distance of the support, and therefore of the detachment axis, with respect to the conveying surface.

8. The separation device according to claim 7, wherein the positioning mechanism makes it possible to selectively place the support, and the detachment roller, either in the engagement configuration, such that the detachment roller can cooperate with the profiled element to separate the latter from the conveying surface, or in a disengagement configuration in which, once the profiled element is engaged on a receiving surface separate from the conveying surface and situated at a distance from the conveying surface downstream of the separation device, the separation device is disengaged from the profiled element so as to no longer touch the profiled element.

9. The separation device according to claim 7, wherein the positioning mechanism has a damping member which allows the support to recoil elastically under a thrust of the profiled element, and
    wherein the separation device detects that a recoiling movement of the support exceeds a predetermined threshold when the profiled element exerts a pressure on the detachment roller beyond a pressure of the predetermined threshold.

10. The separation device according to claim 9, wherein the positioning mechanism is driven by a pneumatic cylinder, which also forms the damping member.

11. The separation device according to claim 1, further comprising a tilting harrow which is mounted pivotably about a harrow axis, which is parallel to the conveying surface, and transverse to the longitudinal direction, wherein the tilting harrow has a row of teeth which are positioned opposite the conveying surface, at a distance from the conveying surface which is non-zero and strictly less than a thickness of the profiled element, such that, when the profiled element is subjected to the advancing movement the longitudinal direction on the conveying surface, the free end front edge of the profiled element can poke onto the teeth and cause a tilting of the tilting harrow about the harrow axis, a consequence of which tilting is to detach the free end front edge of the profiled element from the conveying surface.

12. An extrusion installation comprising:

a die for continuously producing a profiled element by extrusion, and which comprises a conveying surface which receives the profiled element downstream of the die and which forwards the profiled element to a predetermined distance from the die; and the separation device according to claim 1, arranged to remove the profiled element from the conveying surface when the profiled element reaches the predetermined distance.

13. The extrusion installation according to claim 12, wherein the conveying surface is formed by a main roller which defines, with the die, a gap which determines a thickness of the profiled element.

14. The extrusion installation according to claim 12, wherein a material bead, a fold, a partial detachment of the free end front edge of the profiled element, or a combination thereof is generated at the free end front edge of the profiled element, upstream of a position of the detachment roller with respect to the advancing movement, so as to give the free end front edge of the profiled element an excess thickness with respect to a nominal thickness of the profiled element, with a result that the free end front edge of the profiled element has, when it reaches the detachment roller, an apparent height with respect to the conveying surface that is greater than the nominal thickness of the profiled element, thereby facilitating the crossing of the detachment roller by the free end front edge of the profiled element, in the direction of the detachment rotation.

* * * * *